United States Patent
Yang et al.

(10) Patent No.: US 9,627,716 B2
(45) Date of Patent: Apr. 18, 2017

(54) ELECTROLYTE AND LITHIUM BASED BATTERIES

(71) Applicant: GM GLOBAL TECHNOLOGY OPERATIONS LLC, Detroit, MI (US)

(72) Inventors: Li Yang, Troy, MI (US); Mei Cai, Bloomfield Hills, MI (US); Qiangfeng Xiao, Troy, MI (US); Fang Dai, Sterling Heights, MI (US); Mark W. Verbrugge, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/617,463

(22) Filed: Feb. 9, 2015

(65) Prior Publication Data

US 2016/0172711 A1    Jun. 16, 2016

Related U.S. Application Data

(60) Provisional application No. 62/092,535, filed on Dec. 16, 2014.

(51) Int. Cl.

| | |
|---|---|
| *H01M 6/16* | (2006.01) |
| *H01M 10/0569* | (2010.01) |
| *H01M 10/0567* | (2010.01) |
| *H01M 4/134* | (2010.01) |
| *H01M 4/38* | (2006.01) |
| *H01M 10/052* | (2010.01) |

(Continued)

(52) U.S. Cl.
CPC ....... *H01M 10/0569* (2013.01); *H01M 4/134* (2013.01); *H01M 4/386* (2013.01); *H01M 10/052* (2013.01); *H01M 10/0567* (2013.01); *H01M 10/0568* (2013.01); *H01M 2004/027* (2013.01); *H01M 2300/0034* (2013.01); *H01M 2300/0037* (2013.01)

(58) Field of Classification Search
CPC .......... H01M 10/052; H01M 10/0567; H01M 2300/0025; H01M 10/0525; H01M 10/0564; H01M 10/0565; H01M 10/0569; H01M 4/386; H01M 4/387; H01M 4/583; Y02E 60/122; C07C 69/96; Y02T 10/7011

See application file for complete search history.

(56) References Cited

U.S. PATENT DOCUMENTS

| 6,060,184 A * | 5/2000 | Gan ................... H01M 10/0567 429/3 |
|---|---|---|
| 2008/0131783 A1* | 6/2008 | Choi ..................... H01M 4/134 429/232 |

(Continued)

*Primary Examiner* — Patrick Ryan
*Assistant Examiner* — Ben Lewis
(74) *Attorney, Agent, or Firm* — Dierker & Kavanaugh, P.C.

(57) ABSTRACT

An example electrolyte includes a solvent mixture, a lithium salt, a non-polymerizing solid electrolyte interface (SEI) precursor additive, and a solvent additive. The solvent mixture includes dimethyl carbonate (DMC) and fluoroethylene carbonate (FEC) present in a volume to volume ratio ranging from 20 to 1 to 1 to 20. The non-polymerizing SEI precursor additive is present in an amount ranging from greater than 0 wt % to about 10 wt % of a total wt % of the electrolyte, and the solvent additive is present in an amount ranging from greater than 0 wt % to about 10 wt % of the total wt % of the electrolyte.

10 Claims, 2 Drawing Sheets

(51) Int. Cl.
 *H01M 4/02* (2006.01)
 *H01M 10/0568* (2010.01)

(56) References Cited

U.S. PATENT DOCUMENTS

| | | | |
|---|---|---|---|
| 2011/0091768 A1* | 4/2011 | Ohashi | H01M 10/052 |
| | | | 429/199 |
| 2011/0223490 A1 | 9/2011 | Andou et al. | |
| 2012/0121989 A1 | 5/2012 | Roberts et al. | |
| 2012/0231325 A1* | 9/2012 | Yoon | H01M 10/052 |
| | | | 429/163 |
| 2012/0295155 A1 | 11/2012 | Deng et al. | |

* cited by examiner

ELECTROLYTE AND LITHIUM BASED BATTERIES

CROSS-REFERENCE TO RELATED APPLICATIONS

This application claims the benefit of U.S. Provisional Patent Application Ser. No. 62/092,535, filed Dec. 16, 2014, which is incorporated by reference herein in its entirety.

BACKGROUND

Secondary, or rechargeable, lithium ion batteries are often used in many stationary and portable devices, such as those encountered in the consumer electronic, automobile, and aerospace industries. The lithium class of batteries has gained popularity for various reasons including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example electrolyte includes a solvent mixture, a lithium salt, a non-polymerizing solid electrolyte interface (SEI) precursor additive, and a solvent additive. The solvent mixture includes dimethyl carbonate (DMC) and fluoroethylene carbonate (FEC) present in a volume to volume ratio ranging from 20 to 1 to 1 to 20. The non-polymerizing SEI precursor additive is present in an amount of 10 wt % or less of a total wt % of the electrolyte, and the solvent additive is also present in an amount of 10 wt % or less of the total wt % of the electrolyte.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
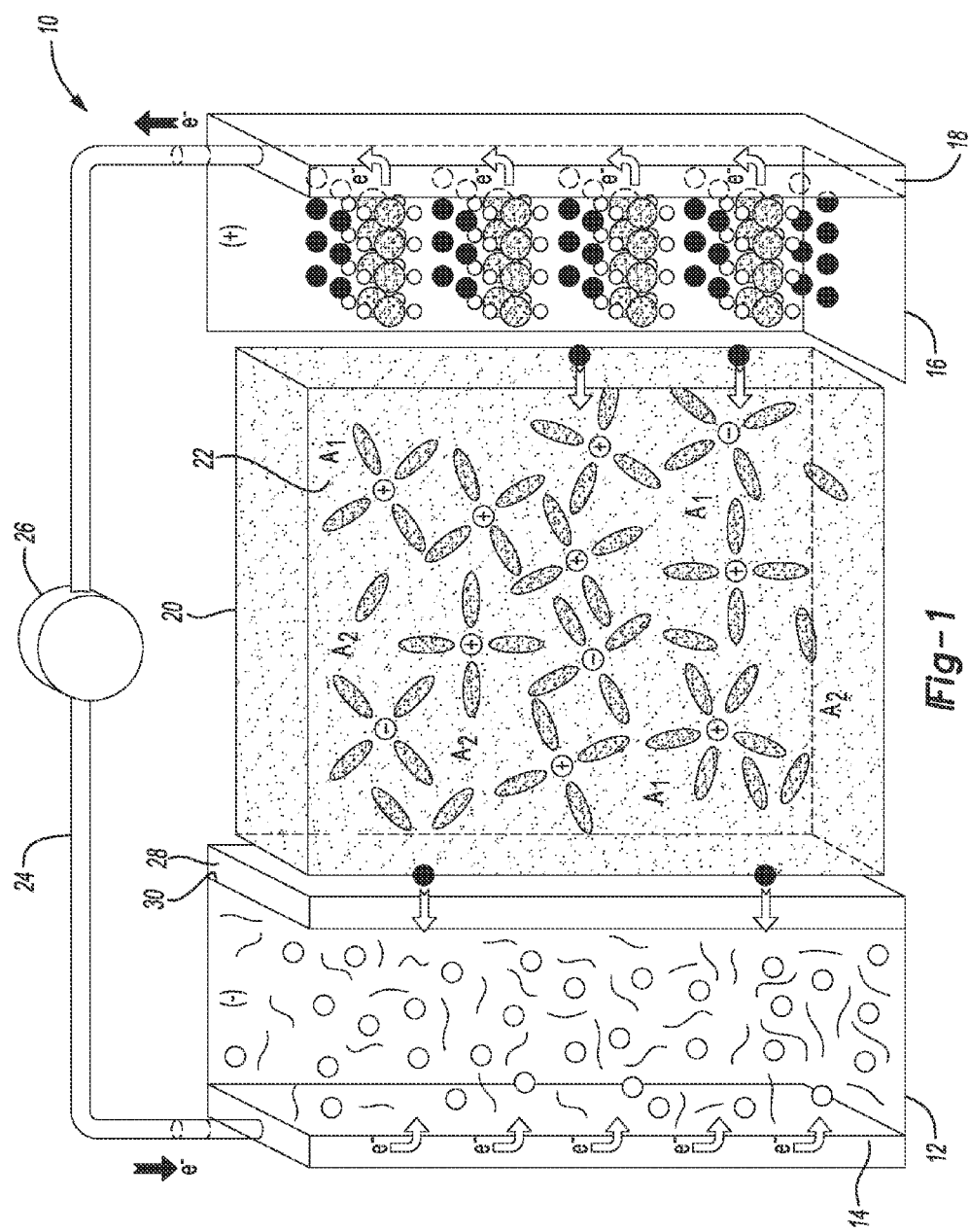
FIG. 1 is a schematic, perspective view of an example of a lithium ion battery showing a charging state and formation of an SEI on a negative electrode surface.

Lithium ion batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. Each of the electrodes is also associated with respective current collectors, which are connected by an interruptible external circuit that allows an electric current to pass between the negative and positive electrodes. Examples of the negative electrode active material for a lithium ion battery may include silicon or silicon alloys.

Silicon or a silicon alloy may be a desirable material for the negative electrode of a lithium ion battery, at least in part because of its high theoretical capacity (e.g., 4200 mAh/g). It may also be desirable to utilize a relatively high silicon loading (e.g., >1.5 mg/cm$^2$) in the negative electrode so that the energy density of the electrode is improved. However, a high silicon loading renders the negative electrode more sensitive to the electrolyte formulation. Generally, electrolyte components decompose when exposed to low potential, and the electrolyte decomposition products deposit on the exposed surfaces of the silicon based negative electrode. This forms a solid electrolyte interphase (SEI) layer. When the negative electrode endures large volume change, new surface of the negative electrode becomes exposed to the electrolyte. In these instances, a large quantity of the SEI layer may be formed, which can block pores for lithium ion transfer and thus deleteriously affect the battery performance.

For silicon or silicon based alloy negative electrodes, fluoroethylene carbonate (FEC) may be added to the electrolyte as a co-solvent (>10 wt %) due to its capability to form a relatively stable SEI on silicon. Other SEI precursor additives (besides FEC) have been added to electrolytes. Examples of other additives, such as vinylene carbonate (VC) and lithium bis(oxalato)borate (LiBOB), can form long chain oligomers or polymers on silicon. With the formation of long chain oligomers or polymer, the space for FEC (together with the FEC decomposed SEI) to anchor on the silicon is reduced, and the electrochemical performance of the silicon may be compromised.

In the examples disclosed herein, the electrolyte includes a particular solvent mixture (e.g., dimethyl carbonate (DMC) and fluoroethylene carbonate (FEC)), a lithium salt, and additives (one of which functions as a suitable SEI precursor). The SEI precursor additives disclosed herein do not form long chain oligomers or polymers and are added to fine tune the SEI. The resulting SEI prevents further reaction between the underlying silicon and the remaining electrolyte, and thus renders better electrochemical performance, for example, compared to an SEI derived from FEC alone, which has a high resistivity for Li$^+$ transferring. In addition, the electrolyte disclosed herein may be used with negative electrodes having a silicon loading greater than 1.5 mg/cm$^2$.

FEC also decomposes to form some undesirable products, leading to the formation of a poor performing SEI on silicon or silicon alloy based electrodes that may block the lithium ion transferring channels and cause catastrophic effects. In the examples disclosed herein, DMC is added to (partially) dissolve the undesirable products formed by FEC and keep the lithium ion transferring channels open. Although DMC has been confirmed to be a good solvent towards the undesirable products (bad SEI) produced by FEC, its low dielectric constant (3.08) still limits its dissolution capability. Therefore, suitable solvent additive(s) is/are added to the electrolyte system. This other additive functions as a strong solvent which can (partially) dissolve the decomposed products, which may otherwise possibly block the lithium ion transferring channels. The solvent additive disclosed herein has higher dielectric constant (>25), and when combined with DMC increases the dissolution of the undesirable products (bad SEI) produced by FEC and renders improved electrochemical performance of the silicon or silicon alloy based lithium ion batteries.

The electrolyte disclosed herein provides a controlled environment in which the SEI layer is formed. The resulting SEI layer has a suitable thickness (ranging from about 30 Å to about 100 Å), is electronically insulating, and is lithium ion conducting. The SEI layer that is formed covers the silicon negative electrode surface and blocks electrons from diffusing out of the negative electrode, which would otherwise inevitably consume the electrolyte by electrochemical reduction. Furthermore, the SEI layer can impart kinetic stability to the electrolyte against further reductions in subsequent cycles. Overall, the SEI layer disclosed herein contributes to good cycling of the battery.

The electrolyte disclosed herein includes a solvent mixture of dimethyl carbonate (DMC) and fluoroethylene carbonate (FEC) present in a volume to volume ratio ranging from 20 to 1 to 1 to 20. In an example, the volume to volume ratio of DMC to FEC is 3 to 1. In another example, the electrolyte includes about 80% by volume of DMC and about 20% by volume of FEC. In still another example, the electrolyte includes about 88% by volume of DMC and about 15% by volume of FEC.

Using FEC as a co-solvent aids in forming the desirable SEI layer on the exposed surface(s) of the silicon-based negative electrode during a pre-lithiation process or in situ in the lithium ion battery. The FEC is active and readily decomposes to form several desirable and undesirable SEI components that cover the negative electrode during pre-lithiation or formation and following a cycling process. The DMC partially dissolves (swells) the undesirable SEI components produced from FEC decomposition. Dissolution of these undesirable SEI components contributes to maintaining open pores within the SEI layer and the negative electrode for lithium ion tunneling.

In addition to the solvent mixture, the electrolyte also includes the lithium salt. Examples of the lithium salt include LiClO$_4$, LiAlCl$_4$, LiI, LiBr, LiSCN, LiBF$_4$, LiB(C$_6$H$_5$)$_4$, LiAsF$_6$, LiCF$_3$SO$_3$, LiN(FSO$_2$)$_2$ (LIFSI), LiN(CF$_3$SO$_2$)$_2$ (LITFSI or lithium bis(trifluoromethylsulfonyl) imide), LiPF$_6$, LiB(C$_2$O$_4$)$_2$ (LiBOB), LiBF$_2$(C$_2$O$_4$) (LiODFB), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiNO$_3$, and mixtures thereof. In an example, the concentration of the salt in the electrolyte is about 1 mol/L.

As mentioned above, one or more of the additives in the electrolyte is the non-polymerizing SEI precursor additive. The non-polymerizing SEI precursor additive is present in the electrolyte in an amount ranging from greater than 0 wt % to about 10 wt % of a total wt % of the electrolyte. In an example, the non-polymerizing SEI precursor additive is LiNO$_3$ or a 5-membered ring that can undergo a ring opening reduction. Some specific examples of the 5-membered ring include ethylene carbonate

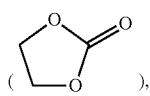

lithium difluoro(oxalato)borate (LiODFB,

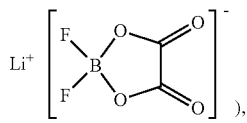

1,3-propanesultone

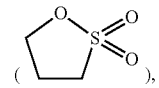

vinyl ethylene carbonate (VEC,

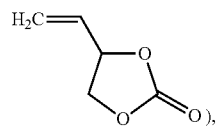

sulfolane

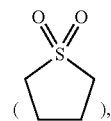

gamma-butrolactone (γ-butrolactone,

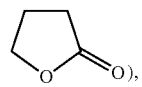

and combinations thereof.

Also as mentioned above, one of the additives in the electrolyte is the solvent additive. The solvent additive, combined with DMC, renders a strong solubility solvent mixture having a strong solubility of the undesirable SEI components produced by FEC decomposition. In an example, the strong solubility solvent has a high electric constant (>25). The solvent additive is present in the electrolyte in an amount ranging from greater than 0 wt % to about 10 wt % of the total wt % of the electrolyte. Examples of the solvent additive include dimethylacetamide (DMAc), N-methyl-2-pyrrolidone (NMP), dimethyl sulfoxide (DMSO), dimethyl sulfone (DMS), ethyl methyl sulfone (EMS), and combinations thereof. In an example, 2 wt % of dimethyl sulfone (DMS) is added to the electrolyte.

The electrolyte may be prepared by mixing the solvent mixture, the lithium salt, and the additives together.

The electrolyte may be used in a pre-lithiation process to form the SEI layer on a silicon based negative electrode or may be used in a lithium ion battery to form the SEI layer on the silicon based negative electrode in situ. In an example, the electrolyte may be part of a pre-lithiation kit which also includes the silicon based negative electrode (which may have a silicon loading of >1.5 mg/cm$^2$).

The silicon based negative electrode may be purchased or fabricated. The silicon-based negative electrode includes any silicon-based lithium host material (i.e., active material) that can sufficiently undergo lithium insertion and deinsertion with copper or another suitable negative-side current collector functioning as the negative terminal. Examples of the silicon active material include crystalline silicon, amorphous silicon, silicon oxide ($SiO_x$, $0<x\leq2$), silicon alloys (e.g., Si—Sn), etc. The silicon active material may be in the form of a powder, particles, etc. ranging from nano-size to micro-size.

The silicon based negative electrode may also include a polymer binder material to structurally hold the silicon active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Other suitable binders include sodium alginate, polyvinyl alcohol (PVA) or other water-soluble binders.

Still further, the silicon based negative electrode may also include a conductive filler material. The conductive filler material may be a conductive carbon material. The conductive carbon material may be a high surface area carbon, such as acetylene black (i.e., carbon black). Other examples of suitable conductive fillers, which may be used alone or in combination with carbon black, include graphene, graphite, carbon nanotubes, and/or carbon nanofibers. The conductive filler material is included to ensure electron conduction between the active material and the negative-side current collector.

The silicon based negative electrode may include up to 90% by weight (i.e., 90 wt %) of the silicon active material. In an example, the silicon based negative electrode includes from about 70 wt % to about 90 wt % of the silicon active material, from about 5 wt % to about 15 wt % of the conductive filler material, and about 5 wt % to about 15 wt % of the polymer binder material. A slurry of these materials may be made, and may be mixed to obtain a homogeneous solution or dispersion. The solution or dispersion may then be doctor blade coated (or otherwise deposited, cast, etc.) onto the negative-side current collector current collector. The solution may be dried to form the silicon based negative electrode.

As previously mentioned, the electrolyte may be used in a pre-lithiation process to form the SEI layer on a silicon based negative electrode. Pre-lithiation may be accomplished using a lithium-silicon half cell method. More specifically, the Li—Si half cell is assembled using the silicon based negative electrode, which is soaked in the electrolyte disclosed herein. A voltage potential is applied to the half cell, which causes the FEC and non-polymerizing SEI precursor additive to form the desirable SEI on the silicon based negative electrode. The non-polymerizing SEI precursor additives are reduced before, or after, or at the same time the FEC reduces. The non-polymerizing SEI precursor additives are added with a controlled quantity so that the SEI precursor additive decomposed products cover a small portion of the silicon based negative electrode, and the remainder of the silicon based negative electrode remains a clean surface for the FEC decomposed products to anchor thereof. The FEC decomposition products may be LiF, $Li_2CO_3$, $Li_xPF_yO_z$, F-replaced Lithium Ethylene Di Carbonate (F-LEDC), and an unsaturated polyolefin.

The voltage potential may be applied for a time sufficient to form the SEI layer. In an example, when a higher current is used, the exposure time may be shorter, for example, less than 10 hours. Similarly, when a lower current is used, the exposure time may be longer, for example, from about 10 hours to about 100 hours. The SEI layer may have a thickness of about 100 Å or less.

During pre-lithiation, lithium ions are also dissolved (or stripped) from the lithium metal of the Li—Si half cell and are alloyed with silicon by an electrochemical reaction with the pre-lithiation electrolyte (which can conduct the lithium ions). The lithium ions can alloy with the silicon-based active material, thereby lithiating the silicon based negative electrode.

In this example, the lithiated silicon based negative electrode having the SEI layer formed thereon may be rinsed to remove excess electrolyte solution and used as a negative electrode in any lithium based battery operable with a silicon based negative electrode. Examples of suitable lithium based batteries include a Si(Li)—S battery (with a sulfur based positive electrode, e.g., a sulfur-carbon composite electrode) or a lithium ion based supercapacitor, such as Si(Li)-porous carbon or Si(Li)-graphene, etc.

For the Si(Li)—S battery, it is to be understood that the SEI layer is to be formed ex situ using the pre-lithiation technique previously described. In addition to forming the SEI layer, this technique lithiates the silicon negative electrode to form the Si(Li) negative electrode. The Si(Li) negative electrode should be rinsed to remove excess FEC, which can react with polysulfides when the Si(Li)—S battery is discharging.

The Si(Li)—S battery includes the previously described lithiated silicon based negative electrode (including the lithiated silicon active material, the polymer binder, and the conductive filler), any example of the negative-side current collector disclosed herein, a sulfur based positive electrode, and any example of the positive-side current collector disclosed herein. Examples of the positive- and negative-side current collectors are discussed below in reference to FIG. 1.

The positive electrode for the Si(Li)—S battery may include a sulfur based active material that can sufficiently undergo lithium alloying and dealloying with aluminum (or another suitable current collector) functioning as the positive terminal of the battery. An example of the sulfur based active material is a sulfur-carbon composite. In an example, the weight ratio of S to C in the positive electrode 14 ranges from 1:9 to 9:1. The positive electrode in the Si(Li)—S battery may also include any of the binder material(s) and conductive filler(s) disclosed herein.

A porous polymer separator may be positioned between the negative and positive electrodes. Examples of the porous polymer separator are provided below in reference to FIG. 1.

The negative electrode, positive electrode, and porous separator are soaked with an electrolyte. The electrolyte for the Si(Li)—S battery is different than the electrolyte disclosed herein, and does not include FEC. In an example, the electrolyte for the Si(Li)—S battery includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, LiN (FSO$_2$)$_2$ (LIFSI), LiN(CF$_3$SO$_2$)$_2$ (LITFSI), LiPF$_6$, LiPF$_4$(C$_2$O$_4$) (LiFOP), LiNO$_3$, and mixtures thereof.

The Si(Li)—S battery also includes an external circuit and a load. The application of the load to the silicon(lithium) sulfur battery closes the external circuit and connects the negative electrode and the positive electrode. The closed external circuit enables a working voltage to be applied across the silicon(lithium) sulfur battery.

Once the SEI layer is formed and the negative electrode is lithiated, the lithiated silicon based negative electrode may be incorporated into the silicon(lithium) sulfur battery, and the battery may be cycled to generate a useful charge during battery discharge and to be recharged or repowered during battery charging.

In another example, the SEI layer may be formed in situ in a lithium ion battery. An example lithium ion battery 10 is shown in FIG. 1. The lithium ion battery 10 includes the previously described silicon based negative electrode 12 (including the silicon active material, the polymer binder, and the conductive filler), the negative-side current collector 14, a positive electrode 16, and a positive-side current collector 18.

The positive electrode 16 may be formed from any lithium-based active material that can sufficiently undergo lithium insertion and deinsertion while aluminum or another positive-side current collector 18 is functioning as the positive terminal of the lithium ion battery 10. One common class of known lithium-based active materials suitable for the positive electrode 16 includes layered lithium transition metal oxides. For example, the lithium-based active material may be spinel lithium manganese oxide (LiMn$_2$O$_4$), lithium cobalt oxide (LiCoO$_2$), a manganese-nickel oxide spinel [Li(Mn$_{1.5}$Ni$_{0.5}$)O$_2$], a layered nickel-manganese-cobalt oxide [Li(Ni$_{1-x}$Mn$_{1-y}$Co$_{x+y}$)O$_2$], LiNiO$_2$, Li$_2$MSiO$_4$ (M=Co, Fe, Mn), a lithium iron polyanion oxide, such as lithium iron phosphate (LiFePO$_4$) or lithium iron fluorophosphate (Li$_2$FePO$_4$F), or a lithium rich layer-structure, such as xLi$_2$MnO$_3$-(1−x)LiMO$_2$ (M is composed of any ratio of Ni, Mn and Co). Other lithium-based active materials may also be utilized, such as LiNi$_{1-x}$Co$_{1-y}$M$_{x+y}$O$_2$ or LiMn$_{1.5-x}$Ni$_{0.5-y}$M$_{x+y}$O$_4$ (M is composed of any ratio of Al, Ti, Cr, and/or Mg), stabilized lithium manganese oxide spinel (Li$_x$Mn$_{2-y}$M$_y$O$_4$, where M is composed of any ratio of Al, Ti, Cr, and/or Mg), lithium vanadium oxide (LiV$_2$O$_5$), Li$_2$MSiO$_4$ (where M is composed of any ratio of Co, Fe, and/or Mn), xLi$_2$MnO$_3$-(1−x)LiMO$_2$ (where M is composed of any ratio of Ni, Mn and/or Co), and any other high energy nickel-manganese-cobalt material (HE-NMC). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The positive electrode 16 in the lithium ion battery 10 may include any of the previously mentioned binder materials and conductive fillers.

In the lithium ion battery 10, a porous polymer separator 20 is positioned between the negative and positive electrodes 12, 16. The porous polymer separator 20 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 16 include single layer polypropylene membranes, such as CELGARD 2400 and CELGARD 2500 from Celgard, LLC (Charlotte, N.C.). It is to be understood that the porous separator 20 may be coated or treated, or uncoated or untreated. For example, the porous separator may or may not be coated or include any surfactant treatment thereon.

In other examples, the porous separator 20 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separator 20 is poly(p-hydroxybenzoic acid). In yet another example, the porous separator 20 may be chosen from a combination of the polyolefin (such as PE and/or PP) and one or more of the other polymers listed above.

The porous separator 20 may be a single layer or may be a multi-layer (e.g., bilayer, trilayer, etc.) laminate fabricated from either a dry or wet process. The porous separator 20 operates as an electrical insulator (preventing the occurrence of a short), a mechanical support, and a barrier to prevent physical contact between the two electrodes 12, 16. The porous separator 20 also ensures passage of lithium ions (identified by the Li$^+$) through the electrolyte 22 filling its pores.

The negative electrode 12, positive electrode 16, and porous separator 20 are soaked with the electrolyte 22 disclosed herein, which includes the SEI precursor additive A$_1$ and the solvent additive A$_2$.

The lithium ion battery 10 also includes an external circuit 24 and a load 26. The application of the load 26 to the lithium ion battery 10 closes the external circuit 24 and connects the negative electrode 12 and the positive electrode 16. The closed external circuit enables a working voltage to be applied across the lithium ion battery 10.

When the SEI layer 28 is formed in situ in the lithium ion battery 10 on the surface 30 of the negative electrode 12, a voltage may be applied on the negative electrode 12 (e.g., initiating a charging cycle), in order to force the reactions to happen between the additive A$_1$ in the electrolyte 22 and the silicon in the negative electrode 12. Upon application of the voltage, the non-polymerizing SEI precursor additive A$_1$ undergoes the reduction. The product of this reaction deposits on a portion of the exposed negative electrode surface 30. The relatively small amount of this additive $A_1$ in the electrolyte 22 will not cover the entire surface 30 of the negative electrode 12, and thus some silicon remains exposed for reaction with the FEC decomposition products. When the FEC in the electrolyte 22 decomposes, the decomposition product(s) deposits on the remaining exposed surface(s) of the silicon based negative electrode to form the SEI layer 28. At least some of the FEC decomposition product(s) bond to the silicon in the negative electrode 12.

The solvent additive $A_2$ may increase the solubility of the electrolyte towards undesirable SEI components produced by FEC.

Lithiation of the negative electrode 12 also occurs during this initial charging cycle.

Once the SEI layer 28 is formed and the negative electrode 12 is lithiated, the lithium ion battery 10 may be cycled to generate a useful charge during battery 10 discharge and to be recharged or repowered during battery 10 charging.

The lithium ion battery 10 generally operates by reversibly passing lithium ions between the negative electrode 12 and the positive electrode 16. In the fully charged state, the voltage of the battery 10 is at a maximum (typically in the range 2.0 to 5.0V); while in the fully discharged state, the voltage of the battery 10 is at a minimum (typically in the range 1.0 to 3.0V). Essentially, the Fermi energy levels of the active materials in the positive and negative electrodes 16, 12 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 26 enables an electronic current flow in the external circuit 24 with a direction such that the difference between the Fermi levels (and, correspondingly, the cell voltage) decreases. The reverse happens during battery charging: the battery charger forces an electronic current flow in the external circuit 24 with a direction such that the difference between the Fermi levels (and, correspondingly, the cell voltage) increases.

At the beginning of a discharge (not shown in FIG. 1), the negative electrode 12 of the lithium ion battery 10 contains a high concentration of intercalated lithium while the positive electrode 16 is relatively depleted. When the negative electrode 12 contains a sufficiently higher relative quantity of intercalated lithium, the lithium ion battery 30 can generate a beneficial electric current by way of reversible electrochemical reactions that occur when the external circuit 24 is closed to connect the negative electrode 12 and the positive electrode 16. The establishment of the closed external circuit under such circumstances causes the extraction of intercalated lithium from the negative electrode 12. The extracted lithium atoms are split into lithium ions (identified by the black dots and by the open circles having a (+) charge) and electrons ($e^-$) as they leave an intercalation host at the negative electrode-electrolyte interface.

The chemical potential difference between the positive electrode 16 and the negative electrode 12 (ranging from about 2.0 volts to about 5.0 volts, depending on the exact chemical make-up of the electrodes 16, 12) drives the electrons ($e^-$) produced by the oxidation of intercalated lithium at the negative electrode 12 through the external circuit 24 towards the positive electrode 16. The lithium ions are concurrently carried by the electrolyte solution through the porous separator 18 towards the positive electrode 16. The electrons ($e^-$) flowing through the external circuit 24 and the lithium ions migrating across the porous separator 18 in the electrolyte solution eventually reconcile and form intercalated lithium at the positive electrode 16. The electric current passing through the external circuit 24 can be harnessed and directed through the load device 26 until the level of intercalated lithium in the coated electrode 10 falls below a workable level or the need for electrical energy ceases.

The lithium ion battery 10 may be recharged (shown in FIG. 1) after a partial or full discharge of its available capacity. To charge the lithium ion battery 10, an external battery charger is connected to the positive and the negative electrodes 16, 12, to drive the reverse of battery discharge electrochemical reactions. During recharging, the electrons ($e^-$) flow back towards the negative electrode 12 through the external circuit 24, and the lithium ions are carried by the electrolyte across the porous separator 20 back towards the negative electrode 12. The electrons ($e^-$) and the lithium ions are reunited at the negative electrode 12, thus replenishing it with intercalated lithium for consumption during the next battery discharge cycle.

The external battery charger that may be used to charge the lithium ion battery 10 may vary depending on the size, construction, and particular end-use of the lithium ion battery 10. Some suitable external battery chargers include a battery charger plugged into an AC wall outlet and a motor vehicle alternator.

Either of the Si(Li)—S battery or the lithium ion battery 10 disclosed herein may also include a wide range of other components. For instance, the Si(Li)—S battery or the lithium ion battery 10 may include a casing, gaskets, terminals, tabs, and any other desirable components or materials that may be situated between or around the negative and positive electrodes for performance-related or other practical purposes. Moreover, the size and shape of the battery, as well as the design and chemical make-up of its main components, may vary depending on the particular application for which it is designed. Battery-powered automobiles and hand-held consumer electronic devices or power tools, for example, are instances where the battery would most likely be designed to different size, capacity, and power-output specifications. The respective batteries may also be connected in series and/or in parallel with other similar batteries to produce a greater voltage output and current (if arranged in parallel) or voltage (if arranged in series) if the load device so requires.

To further illustrate the present disclosure, an example is given herein. It is to be understood that this example is provided for illustrative purposes and is not to be construed as limiting the scope of the present disclosure.

EXAMPLE

A first example electrochemical cell was formulated with a silicon based working electrode (1.5 mg Si/cm$^2$) and a lithium counter electrode. The electrolyte of the first example electrochemical cell included 1M LiPF$_6$ in DMC with 15 vol % FEC and 0.5 wt % of LiODFB.

A second example electrochemical cell was formulated with a silicon based working electrode and a lithium counter electrode. The electrolyte of the second example electrochemical cell included 1M LiPF$_6$ in DMC with 15 vol % FEC and 2 wt % of dimethyl sulfone.

A first comparative example electrochemical cell was formulated with a silicon based working electrode (1.5 mg Si/cm$^2$) and a lithium counter electrode. The electrolyte of the first comparative example electrochemical cell included 1M LiPF$_6$ in ethylene carbonate and ethyl-methyl carbonate (EC:EMC 1:1 vol ratio) with 15 vol % FEC and no additives.

A second comparative example electrochemical cell was formulated with a silicon based working electrode (1.5 mg Si/cm$^2$) and a lithium counter electrode. The electrolyte of the second comparative example electrochemical cell included 1M LiPF$_6$ in DMC with 15 vol % FEC and no additives.

Figure 2:
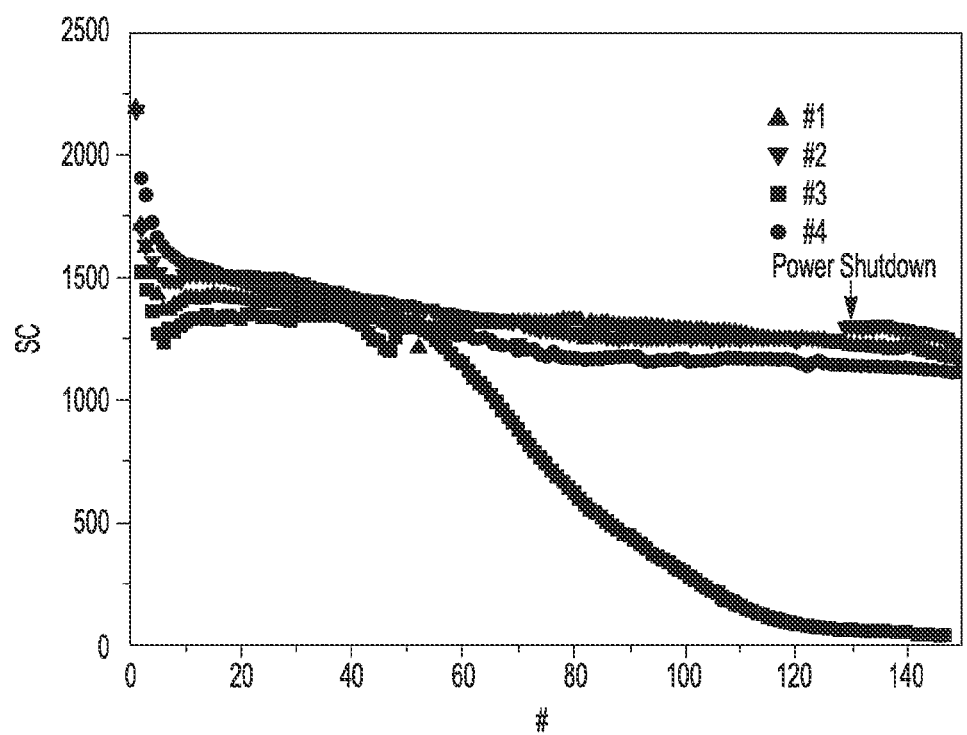
FIG. 2 is a graph illustrating the specific capacity (mAh/$g_{(Si)}$, Y-axis labeled "SC") vs. cycle number (X-axis labeled "#") for example cells including silicon working electrodes and example electrolytes including at least one of the additives disclosed herein, and comparative example cells including silicon working electrodes and comparative electrolytes that do not include at least one of the additives disclosed herein.

The test conditions for the comparative and example cells were: room temperature; current=250 µA; area=1.23 cm$^2$; and voltage cutoff ranging from 0.05V to 1V. The specific capacity results are shown in FIG. 2. In FIG. 2, the Y axis, labeled SC, represents the specific capacity and the X axis, labeled "#," represents the cycle number. The power was shut down at about the 130$^{th}$ cycle.

As illustrated in FIG. 2, throughout most of the cycles and especially after cycle 50, the specific capacity of the first example cell (labeled "1"), with an example of the non-polymerizing SEI precursor additive in the electrolyte, was generally higher than the specific capacity of either of the comparative example cells (labeled "3" and "4"). Also as illustrated in FIG. 2, the first example cell exhibited more stable capacity performance than comparative example cell 3 throughout all of the cycles.

Also as illustrated in FIG. 2, throughout most of the cycles and especially after cycle 10, the specific capacity of the second example cell (labeled "2"), with an example of the solvent additive in the electrolyte, was generally higher than the specific capacity of either of the comparative examples cells 3 and 4. Also as illustrated in FIG. 2, the second example cell exhibited more stable capacity performance than comparative example cell 3 after cycle 50.

It is believed that the cycling performance may be even further improved when the non-polymerizing SEI precursor additive and the solvent additive are incorporated into the same electrolyte.

It is to be understood that the ranges provided herein include the stated range and any value or sub-range within the stated range. For example, a range of from about 70 wt % to about 90 wt % should be interpreted to include not only the explicitly recited limits of from about 70 wt % to about 90 wt %, but also to include individual values, such as 75.5 wt %, 83 wt %, 90 wt %, etc., and sub-ranges, such as from about 73 wt % to about 85 wt %, etc. Furthermore, when "about" is utilized to describe a value, this is meant to encompass minor variations (up to +/−5%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. An electrolyte, consisting of:
a solvent mixture of dimethyl carbonate (DMC) and fluoroethylene carbonate (FEC) present in a volume to volume ratio ranging from 20 to 1 to 1 to 20;
a lithium salt;
a non-polymerizing solid electrolyte interface (SEI) precursor additive present in an amount ranging from greater than 0 wt % to about 10 wt % of a total wt % of the electrolyte, wherein the non-polymerizing SEI precursor additive is selected from the group consisting of LiNO$_3$ and a 5-membered ring compound that is to undergo a reduction and form an SEI layer on a silicon based electrode, the 5-membered ring compound being selected from the group consisting of ethylene carbonate, lithium difluoro(oxalato)borate (LiODFB), 1,3-propanesultone, vinyl ethylene carbonate, sulfolane, and combinations thereof; and
a solvent additive, the solvent additive being present in an amount ranging from greater than 0 wt % to about 10 wt % of the total wt % of the electrolyte.

2. The electrolyte as defined in claim 1 wherein the solvent additive is selected from the group consisting of dimethylacetamide, N-methyl-2-pyrrolidone, dimethyl sulfoxide, dimethyl sulfone, ethyl methyl sulfone, gamma-butyrolactone, and combinations thereof.

3. The electrolyte as defined in claim 1 wherein the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiCF$_3$SO$_3$, LiAsF$_6$, and combinations thereof.

4. The electrolyte as defined in claim 1 wherein:
the solvent mixture of DMC and FEC is present in a volume to volume ratio about 17:3;
the lithium salt is LiPF$_6$;
the non-polymerizing SEI precursor additive is lithium difluoro(oxalato)borate; and
the solvent additive is dimethyl sulfone.

5. A pre-lithiation kit, comprising:
a negative electrode having a silicon active material loading greater than 1.5 mg/cm$^2$; and
a pre-lithiation electrolyte, consisting of:
a solvent mixture of dimethyl carbonate (DMC) and fluoroethylene carbonate (FEC) present in a volume to volume ratio ranging from 20 to 1 to 1 to 20;
a lithium salt;
a non-polymerizing solid electrolyte interface (SEI) precursor additive present in an amount ranging from greater than 0 wt % to about 10 wt % of a total wt % of the electrolyte, wherein the non-polymerizing SEI precursor additive is selected from the group consisting of LiNO$_3$ and a 5-membered ring compound that is to undergo a reduction and form an SEI layer on a silicon based electrode, the 5-membered ring compound being selected from the group consisting of ethylene carbonate, lithium difluoro(oxalato)borate (LiODFB), 1,3-propanesultone, vinyl ethylene carbonate, sulfolane, and combinations thereof; and
a solvent additive, the solvent additive being present in an amount ranging from greater than 0 wt % to about 10 wt % of the total wt % of the electrolyte.

6. The pre-lithiation kit as defined in claim 5 wherein the solvent additive is selected from the group consisting of dimethylacetamide, N-methyl-2-pyrrolidone, dimethyl sulfoxide, dimethyl sulfone, ethyl methyl sulfone, gamma-butyrolactone, and combinations thereof.

7. The pre-lithiation kit as defined in claim 5 wherein the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiCF$_3$SO$_3$, LiAsF$_6$, and combinations thereof.

8. A lithium ion battery, comprising:
   a negative electrode having a silicon active material loading greater than 1.5 mg/cm$^2$;
   a positive electrode;
   a separator positioned between the negative electrode and the positive electrode; and
   an electrolyte solution soaking each of the positive electrode, the negative electrode, and the separator, the electrolyte solution consisting of:
      a solvent mixture of dimethyl carbonate (DMC) and fluoroethylene carbonate (FEC) present in a volume to volume ratio ranging from 20 to 1 to 1 to 20;
      a lithium salt;
      a non-polymerizing solid electrolyte interface (SEI) precursor additive present in an amount ranging from greater than 0 wt % to about 10 wt % of a total wt % of the electrolyte, wherein the non-polymerizing SEI precursor additive is selected from the group consisting of LiNO$_3$ and a 5-membered ring compound that is to undergo a reduction and form an SEI layer on a silicon based electrode, the 5-membered ring compound being selected from the group consisting of ethylene carbonate, lithium difluoro(oxalato)borate (LiODFB), 1,3-propane sultone, vinyl ethylene carbonate, sulfolane, and combinations thereof; and
      a solvent additive present in an amount ranging from greater than 0 wt % to about 10 wt % of the total wt % of the electrolyte.

9. The lithium ion battery as defined in claim 8 wherein the solvent additive is selected from the group consisting of dimethylacetamide, N-methyl-2-pyrrolidone, dimethyl sulfoxide, dimethyl sulfone, ethyl methyl sulfone, gamma-butyrolactone, and combinations thereof.

10. The lithium ion battery as defined in claim 8 wherein the lithium salt is selected from the group consisting of lithium bis(trifluoromethylsulfonyl)imide (LiN(CF$_3$SO$_2$)$_2$ or LiTFSI), LiNO$_3$, LiPF$_6$, LiBF$_4$, LiI, LiBr, LiSCN, LiClO$_4$, LiAlCl$_4$, LiB(C$_2$O$_4$)$_2$ (LiBOB), LiB(C$_6$H$_5$)$_4$, LiBF$_2$(C$_2$O$_4$) (LiODFB), LiN(SO$_2$F)$_2$ (LiFSI), LiPF$_3$(C$_2$F$_5$)$_3$ (LiFAP), LiPF$_4$(CF$_3$)$_2$, LiPF$_4$(C$_2$O$_4$) (LiFOP), LiPF$_3$(CF$_3$)$_3$, LiSO$_3$CF$_3$, LiCF$_3$SO$_3$, LiAsF$_6$, and combinations thereof.

* * * * *